(12) United States Patent
Khan et al.

(10) Patent No.: US 10,812,988 B1
(45) Date of Patent: Oct. 20, 2020

(54) METHOD AND DEVICE FOR MAPPING PORTS OF A NETWORK DEVICE

(71) Applicant: Verizon Patent and Licensing Inc., Arlington, VA (US)

(72) Inventors: Fahad Khan, Mckinney, TX (US); Derrick Shane Poer, Fort Worth, TX (US); Gunjan Thakkar, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/444,551

(22) Filed: Jun. 18, 2019

(51) Int. Cl.
*H04W 16/18* (2009.01)
*H04L 12/24* (2006.01)

(52) U.S. Cl.
CPC ............ *H04W 16/18* (2013.01); *H04L 41/22* (2013.01)

(58) Field of Classification Search
CPC .............................. H04W 16/18; H04L 41/22
See application file for complete search history.

(56) References Cited

U.S. PATENT DOCUMENTS

| | | | | |
|---|---|---|---|---|
| 6,957,263 B2 * | 10/2005 | Galou | ................. | H04L 41/0806 709/219 |
| 7,113,789 B1 * | 9/2006 | Boehmke | ............... | G06Q 10/06 455/446 |
| 2008/0267145 A1 * | 10/2008 | Vangati | ................... | H04L 41/12 370/338 |

* cited by examiner

*Primary Examiner* — Julio R Perez

(57) ABSTRACT

A device may receive site property data relating to a site including information relating to a network device associated with the site and a layout of one or more ports of the network device; receive node data relating to a node associated with the site including information relating to one or more physical connections between the node and the ports of the network device; determine availabilities of the ports of the network device based on the physical connections; map the layout of the ports to an image coordinate system associating the ports with respective image coordinates; generate a visual model of the ports of the network device based on the layout and the respective image coordinates including status identifiers indicative of the availabilities of the ports; and cause an action to be performed based on the visual model and the status identifiers.

20 Claims, 8 Drawing Sheets

METHOD AND DEVICE FOR MAPPING PORTS OF A NETWORK DEVICE

BACKGROUND

A mobile network is a communication network where at least the last link is wireless. A mobile network may be distributed over coverage areas or sites that can extend over a wide geographic area and enable a large number of portable transceivers (e.g., computers, smart phones, Internet-of-Things (IoT) devices, and/or other mobile devices) to communicate. A mobile network may be provided in one of different architectures (e.g., a radio access network (RAN) based on an all-in-one macro base station, a RAN based on distributed base stations, a cloud-RAN (C-RAN) based on distributed base stations using common public radio interface (CPRI) standards, and/or the like).

DETAILED DESCRIPTION OF PREFERRED EMBODIMENTS

Figure 1A:
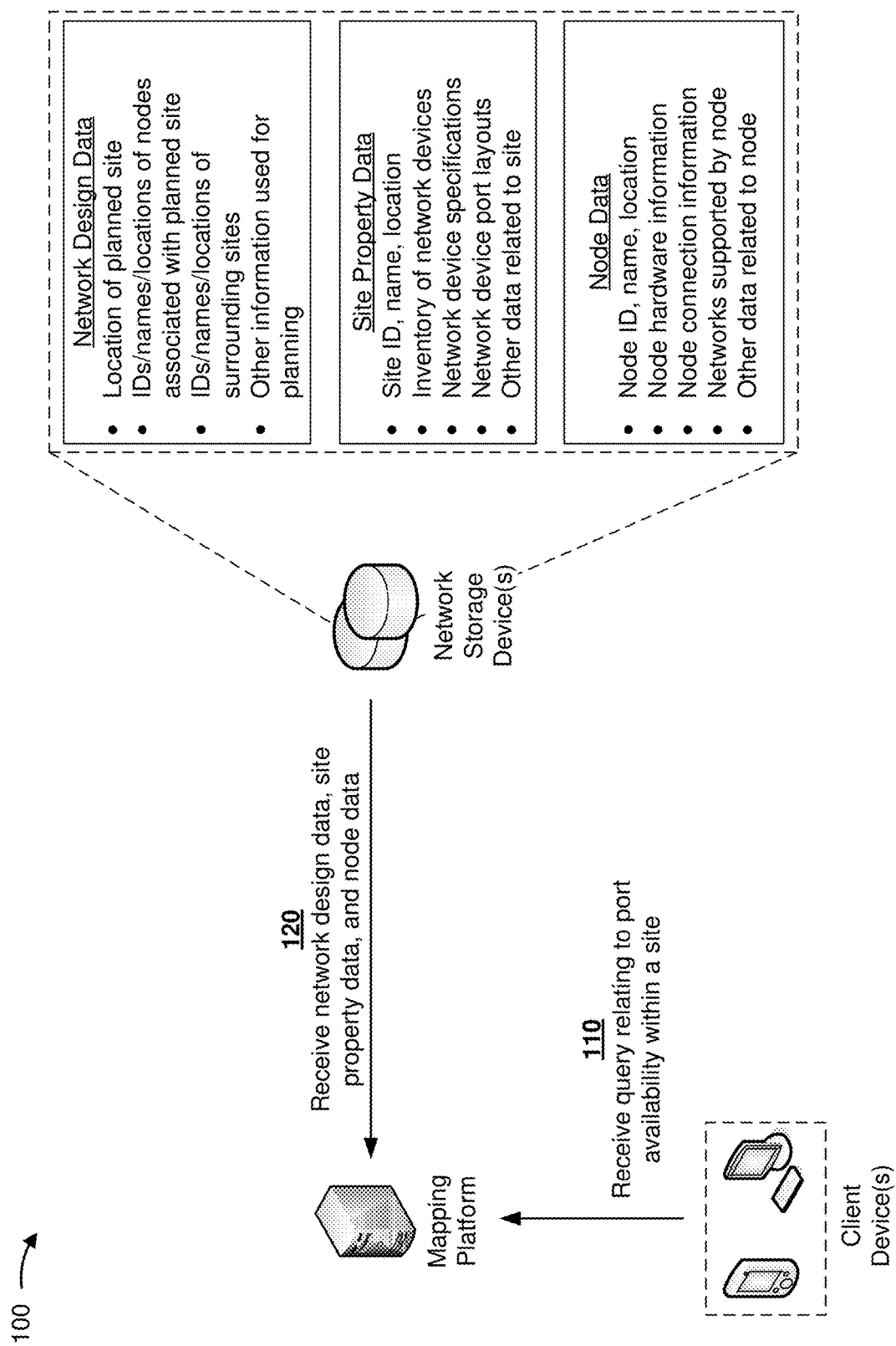
FIGS. 1A-1E are diagrams of one or more example implementations described herein.

The following detailed description of example implementations refers to the accompanying drawings. The same reference numbers in different drawings may identify the same or similar elements.

As reliance on wireless communications becomes more widespread and as an amount of network traffic continues to increase, mobile network operators pay closer attention to network usage and performance to ensure associated network infrastructure can support growing demand. Mobile network operators may monitor network analytics data relating to different coverage areas or sites within a mobile network, and design site plans to build, upgrade, and/or repair network equipment (e.g., baseband units, base stations, routers, modems, switches, gateways, access points, and/or other network devices) associated with a target site needing support. As part of the design process, mobile network operators may need to determine whether a network device of the target site has an available port to use with a site plan, and account for existing port connections between the network device and other nodes (e.g., other network devices associated with the target site and/or other sites). However, with the vast number of nodes that simultaneously interconnect through a given network device, it may be cumbersome to track individual physical connections between the nodes and the different ports of the network device.

In some cases, mobile network operators may rely on information provided by technicians dispatched to a target site. For instance, a technician may visually inspect the ports of a baseband unit at the target site to identify whether certain ports of the baseband unit are physically connected and in use, and create a record of port connections (e.g., manually on paper, using a spreadsheet program, and/or the like). This process can be time-consuming, inefficient, and prone to error. Furthermore, a port of a baseband unit that is seemingly available via visual inspection may in fact be reserved for another site plan and unavailable. In some cases, mobile network operators may rely on certain data analytics tools to track port assignments and availability. However, the data needed to determine port availability of a particular baseband unit may be derived after gathering, compiling, and processing piecemeal data from a variety of different data sources, which can also be time-consuming and prone to error. Furthermore, the availability of such tools may be limited especially when site plans rely on newer radio access technologies (e.g., 5G networks, new radio (NR) networks, and/or the like). Accordingly, the current methods for tracking physical port connections are also unreliable and inadequate to support newer radio access technologies.

Some implementations described herein provide a mapping platform that assists mobile network operators in tracking port connections and identifying available ports for use with a site plan. The mapping platform may receive property data relating to a site, receive node data relating to a node associated with the site, determine an availability of one or more ports of a network device associated with the site based on the node data, map a layout of the ports to an image coordinate system associating the ports with respective image coordinates, generate a visual model of the ports of the network device with status identifiers indicating availability, and cause an action to be performed based on the visual model. In some implementations, the mapping platform may generate the visual model to include interactive features which enable a user to select and reserve available ports via a client device. In some examples, the mapping platform may identify and recommend available ports for the user or automatically reserve available ports for the user. In some examples, the mapping platform may generate a map identifying geographical locations of available ports and transmit the map to the user. Additionally, or alternatively, the mapping platform may receive and process updates to port connections.

In this way, the mapping platform is able to help mobile network operators quickly and easily track the availability of ports of a network device of a particular site, identify available ports, and reserve available ports for a site plan in an efficient and reliable manner. In particular, the mapping platform leverages network analytics data to automate several manual steps involved in identifying and reserving an available port for a site plan. The mapping platform thereby reduces the reliance on on-site technicians and minimizes risks of human error. The mapping platform also saves a considerable amount of time in designing a site plan, thereby enabling mobile network operators to more promptly carry out new builds, upgrades, and/or repairs, and maintaining associated network equipment and/or user equipment in optimal operating condition. The mapping platform additionally conserves time, computational resources, and network resources that mobile network operators may otherwise use to identify and reserve available ports of a network device. Furthermore, the automatability of the mapping platform enables mobile network operators to readily support newer radio access technologies.

FIGS. 1A-1E are diagrams of one or more example implementations 100 described herein. As shown in FIGS. 1A-1E, the example implementation(s) 100 may include a mapping platform, a network storage device, a client device, and a network device. FIGS. 1A-1E present one or more functions that may be performed by the mapping platform to provide a port mapping service. For example, the mapping platform may receive property data relating to a site (also referred to herein as site property data), receive node data relating to a node associated with the site, determine an availability of one or more ports of a network device associated with the site, map a layout of the ports to an image coordinate system, generate a visual model of the ports of the network device with status identifiers indicating availability, and cause an action to be performed based on the visual model. In some implementations, one or more of the functions, described as being performed by the mapping platform, may be performed by another device, such as the network storage device, the client device, the network device, and/or the like.

In some implementations, the mapping platform may be used in association with a port mapping service that is supported by the network storage device. For example, the port mapping service may be used by one or more users (e.g., a mobile network operator, a technician, a carrier, and/or another subscriber) to track physical port connections of a network device, track reserved port connections of a network device, identify available ports of a network device, reserve available ports of a network device for a site plan, and/or the like. The port mapping service may provide features such as recommending available ports to reserve, generating a geographical map of available ports that can be displayed to a user, automatically reserving available ports, providing an interactive visual model of a network device that enables a user to select and reserve available ports via a client device, automatically updating changes to port connections of the network device, and/or the like. A user may access the port mapping service using a client device (e.g., a computer, a smart phone, a mobile device, and/or the like) that is connected to the mapping platform over a wired connection and/or a wireless connection.

As shown in FIG. 1A, and by reference number 110, the mapping platform may receive a query from a client device requesting port availability of a network device associated with a particular site. For example, the query may include a site identifier (e.g., a site identification number, a site name, a site address, a site location, and/or the like). The mapping platform may receive the query from a user (e.g., a mobile network operator, a technician, a carrier, and/or another subscriber) via a user interface of the client device accessing a port mapping service. The mapping platform may be adapted to receive the query as textual data and/or in another format. In some implementations, the mapping platform may generate a geographical map to be displayed on the client device and enable the user to submit the query by selecting an area or a location within the geographical map using a touchscreen, a mouse, a keyboard, a keypad, and/or another input device of the client device. Additionally, or alternatively, the mapping platform may receive the query based on location data provided by a client device (e.g., based on global positioning system (GPS) sensor data provided by a mobile client device of an on-site technician), image data provided by a client device (e.g., based on a digital image of a quick response (QR) code, a barcode, and/or another visual pattern indicative of the site to be queried), and/or the like.

As further shown in FIG. 1A, and by reference number 120, the mapping platform may receive network design data, site property data, and/or node data from one or more network storage devices. In some implementations, the mapping platform may receive the network design data, the site property data, and/or the node data from a client device and/or a network device. The network design data may be received in addition to the query or in place of the query, and may include information used by mobile network operators in designing a site plan (e.g., to repair, upgrade, and/or build network equipment at a particular site). For example, the network design data may include location information of the site, identification information of one or more nodes associated with the site, identification information of one or more surrounding sites, and/or the like. The site property data may include location information of the site and information relating to one or more network devices associated with the site (e.g., an inventory of baseband units, base stations, routers, modems, switches, gateways, access points, and/or the like). In some examples, the site property data may include network device specifications (e.g., information relating to a brand, a model, a serial number, a part number, a port layout, and/or the like). In some examples, the site property data may include information sufficient for the mapping platform to access or otherwise determine the port layout of a network device from another source (e.g., a network storage device maintained by a manufacturer of the network device, and/or the like).

In some implementations, the node data may include information relating to one or more nodes associated with the site (e.g., node identification information, node location information, node hardware information, node connection information, node network information, and/or the like). The node hardware information may include information for identifying the particular network device (e.g., a baseband unit) associated with the site that a node is connected to. The node connection information may include information for identifying the particular port of the network device associated with the site that a node is connected to. In some implementations, the node connection information may include port usage information (e.g., one or more indexes identifying specific ports of the network device that are physically connected to a node, specific ports of the network device that are reserved for a node, specific ports of the network device that are unconnected and unreserved, and/or the like). In some examples, such as for a C-RAN mobile network, the node hardware information may include information identifying a long-term evolution (LTE) baseband unit configured for an LTE evolved NodeB (eNB), a 5G baseband unit configured for a 5G next generation NodeB (gNB), a C-RAN hub of LTE baseband units and/or 5G baseband units, and/or the like. Correspondingly, the node connection information may relate to one or more CPRI connections, and the port usage information may relate to one or more usage of one or more CPRI ports of an LTE baseband unit and/or a 5G baseband unit.

In some implementations, the mapping platform may receive the node data directly from network devices associated with the site, from network equipment associated with the individual nodes, from a client device via user input, and/or another source. In some examples, the mapping platform may receive port usage information of a network device based on information provided by the network device. For example, a network device may be provided with a self-reporting feature that enables the network device to determine port usage information for one or more respective ports of the network device. If capable of the self-reporting feature, the network device may identify information relating to whether a port is connected, unconnected, unconnected and reserved, or unconnected and unreserved, information relating to a corresponding node that a port is connected to or reserved for, and/or other port usage information. The network device may transmit the port usage information to the mapping platform, the client device, the network storage device, and/or another device requesting the port usage information. In some examples, such as if a network device is not capable of self-reporting, port usage information of the network device may be provided via one or more other network devices that are connected to the network device and capable of the self-reporting feature.

In some implementations, the mapping platform may receive port usage information of a network device based on information provided by a user (e.g., a technician) via a client device. In some examples, the mapping platform may cause the client device to provide a user interface (e.g., via a port mapping service) through which the user may manually enter port usage information as observed by the user. For example, the user interface may enable the user to provide information identifying whether a port is connected, unconnected, unconnected and reserved, or unconnected and unreserved, information relating to a corresponding node that a port is connected to or reserved for, and/or other port usage information. The user interface may enable the user to enter the port usage information via an input device of the client device (e.g., a touchscreen, a keyboard, a keypad, and/or the like), and submit the port usage information to the mapping platform in the form of textual data. In some examples, the mapping platform may use a natural language processing model to convert the textual data into an index of port usage information that can be stored in a data structure that is accessible to the mapping platform. For example, the mapping platform may use a natural language processing model that has been trained to parse natural language descriptions of the port usage information from the textual data, and identify whether a port is connected, unconnected, unconnected and reserved, or unconnected and unreserved.

In some implementations, the mapping platform may cause the client device to provide the user with a user interface through which the user may submit a digital image relating to port usage information of the network device. For example, the user interface may prompt the user to take a photo of a port of the network device (e.g., using a camera of the client device), guide the user in finding an appropriate view of the port, capture the digital image, and submit the digital image to the mapping platform in the form of image data. In some examples, the user may submit a digital image of the network device that was previously captured and locally stored on the client device. The mapping platform may use a computer vision model and/or another image-based analytic model to determine port usage information based on the image data. For example, the mapping platform may use a computer vision model that has been trained to recognize a visual pattern in the image data associated with a port, recognize differences between a visual pattern of a port that is connected and a visual pattern of a port that is unconnected, and classify a port as connected or unconnected based on the visual pattern. In some examples, the computer vision model may have been trained to identify a port and/or port usage information of the port based on a label, a light (e.g., a light emitting diode (LED)), and/or another visual cue that may be provided on the network device and associated with the port.

In some implementations, the mapping platform may receive the textual data and/or the image data directly from the client device. Additionally, or alternatively, the textual data and/or the image data may be transmitted to and stored within the network storage device, and the mapping platform may receive the textual data and/or the image data from the network storage device. In some examples, the computer vision model and/or the natural language processing model may be stored within the mapping platform, the client device, the network storage device, and/or otherwise accessible to the mapping platform. In some examples, the computer vision model and/or the natural language processing model may be trained by the mapping platform, the client device, the network device, and/or the network storage device. In some implementations, another device (e.g., a server device, a cloud computing device, and/or the like) may train the computer vision model and/or the natural language processing model, and provide the trained computer vision model and/or the trained natural language processing model for use by the mapping platform, the client device, and/or the network storage device. Additionally, or alternatively, the mapping platform may train the computer vision model and/or the natural language processing model for use by another device (e.g., a server device, a cloud computing device, and/or the like).

In some implementations, the mapping platform may use one or more artificial intelligence techniques, such as machine learning, deep learning, and/or the like to determine port usage information of a network device. As described above, the mapping platform may receive port usage information from user (e.g., a technician) via a client device as textual data and/or image data. The mapping platform may use a model (e.g., a computer vision model, a natural language processing model, and/or the like) to parse the information contained in the textual data and/or the image data, and identify whether one or more ports of the network device are connected, unconnected and reserved, unconnected and unreserved, and/or other port usage information.

In some implementations, the mapping platform may perform a training operation when training and/or generating the model (e.g., the computer vision model, the natural language processing model, and/or the like). For example, the mapping platform may portion the textual data and/or the image data relating to port usage information into a training set (e.g., a set of data to train the model), a validation set (e.g., a set of data used to evaluate a fit of the model and/or to fine tune the model), a test set (e.g., a set of data used to evaluate a final fit of the model), and/or the like. In some examples, the mapping platform may preprocess and/or perform dimensionality reduction to reduce the textual data and/or the image data to a minimum feature set. In some examples, the mapping platform may train the model on this minimum feature set, thereby reducing processing to train the machine learning model, and apply a classification technique, to the minimum feature set.

In some implementations, the mapping platform may use a classification technique, such as a logistic regression classification technique, a random forest classification technique, a gradient boosting machine learning (GBM) technique, and/or the like, to determine a categorical outcome (e.g., that port usage information is successfully identified, that port usage information is not successfully identified, and/or the like). Additionally, or alternatively, the mapping platform may use a naïve Bayesian classifier technique. In this case, the mapping platform may perform binary recursive partitioning to split the data of the minimum feature set into partitions and/or branches and use the partitions and/or branches to perform predictions (e.g., that port usage information is successfully identified, or that port usage information is not successfully identified). Based on using recursive partitioning, the mapping platform may reduce utilization of computing resources relative to manual, linear sorting and analysis of data points, thereby enabling use of thousands, millions, or billions of data points to train a model, which may result in a more accurate model than using fewer data points.

Additionally, or alternatively, where the test data includes image data and/or the like, the mapping platform may use a computer vision technique, such as a convolutional neural network technique to assist in classifying test data (e.g., image data relating to port usage information of a network device) into a particular class (e.g., a class indicating that the port usage information is successfully identified, a class indicating that the port usage information is not successfully identified, and/or the like). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), and/or the like.

Additionally, or alternatively, the mapping platform may train the model (e.g., the computer vision model, the natural language processing model, and/or the like) using a supervised training procedure that includes receiving input to the model from a subject matter expert, which may reduce an amount of time, an amount of processing resources, and/or the like to train the model relative to an unsupervised training procedure. In some examples, the mapping platform may use one or more other model training techniques, such as a neural network technique, a latent semantic indexing technique, and/or the like. For example, the mapping platform may perform an artificial neural network processing technique (e.g., using a two-layer feedforward neural network architecture, a three-layer feedforward neural network architecture, and/or the like) to perform pattern recognition with regard to patterns of whether particular information relating to the network device described using different semantic descriptions can be used to identify the port usage information or not. In this case, using the artificial neural network processing technique may improve an accuracy of the model generated by the mapping platform by being more robust to noisy, imprecise, or incomplete data, and by enabling the mapping platform to detect patterns and/or trends undetectable to human analysts or systems using less complex techniques.

Accordingly, the mapping platform may use any number of artificial intelligence techniques, machine learning techniques, deep learning techniques, and/or the like to determine port usage information of a network device using textual data and/or image data provided by a client device.

Figure 1B:
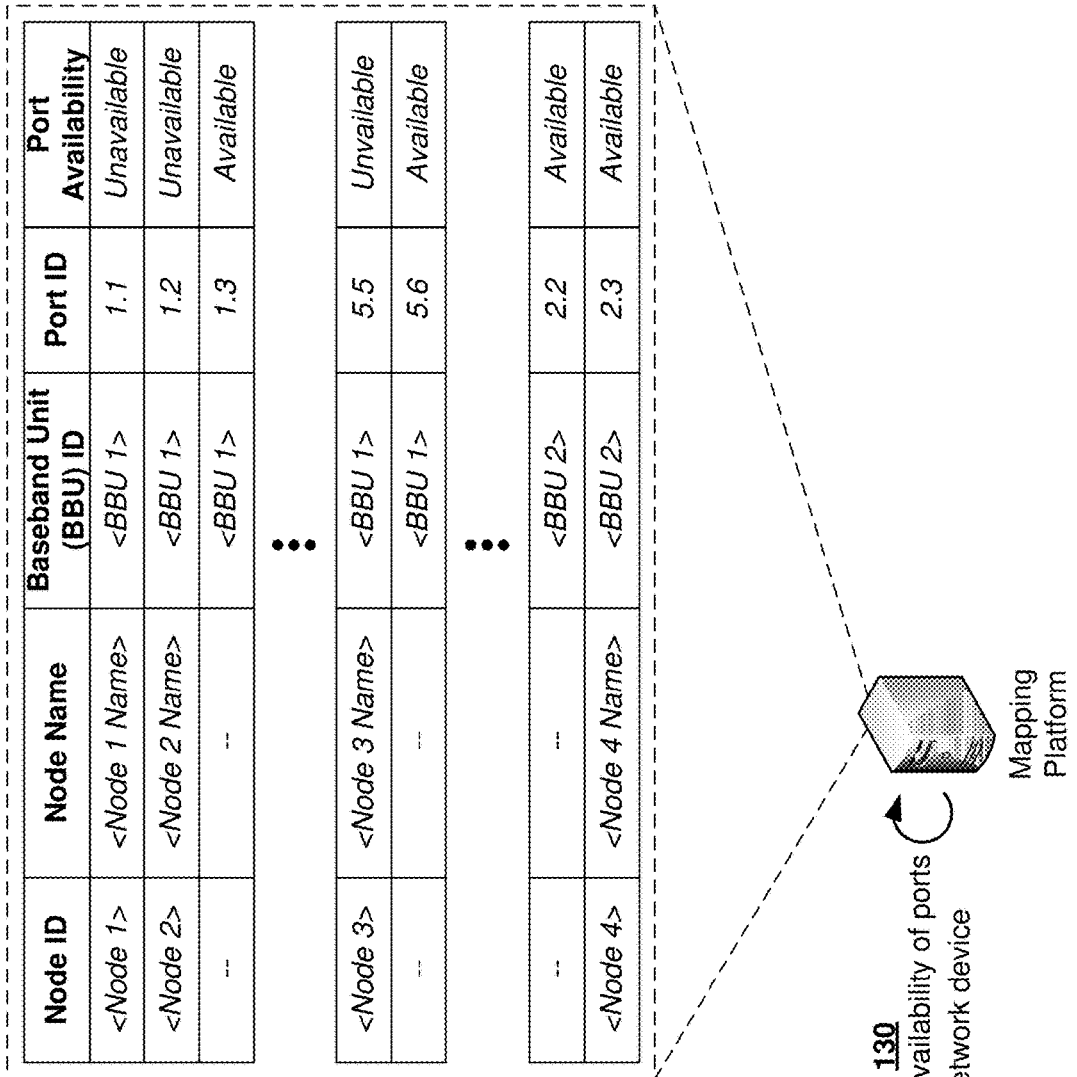

As shown in FIG. 1B, and by reference number 130, the mapping platform may determine an availability of one or more ports of a network device associated with a site based on the site property data and/or the node data. As shown for the example in FIG. 1B, the mapping platform may determine the availability of one or more ports of a baseband unit (e.g., one or more CPRI ports of an LTE baseband unit or a 5G baseband unit) associated with the site. For example, the mapping platform may determine a port of the baseband unit that is physically connected to a node or reserved for a node is unavailable, and determine a port that is neither physically connected nor reserved is available. As shown, the mapping platform may create an index distinguishing between the ports of the baseband unit (e.g., using a port identification number and/or another indexing scheme) and identifying the respective nodes (e.g., by a node identification number, a node name, and/or the like) assigned to the unavailable ports. In some implementations, the mapping platform may determine port availability of a plurality of baseband units associated with the site and/or determine port availability of another network device associated with the site. The mapping platform may store port availability information and corresponding node information in a data structure that is accessible by the mapping platform.

Figure 1C:
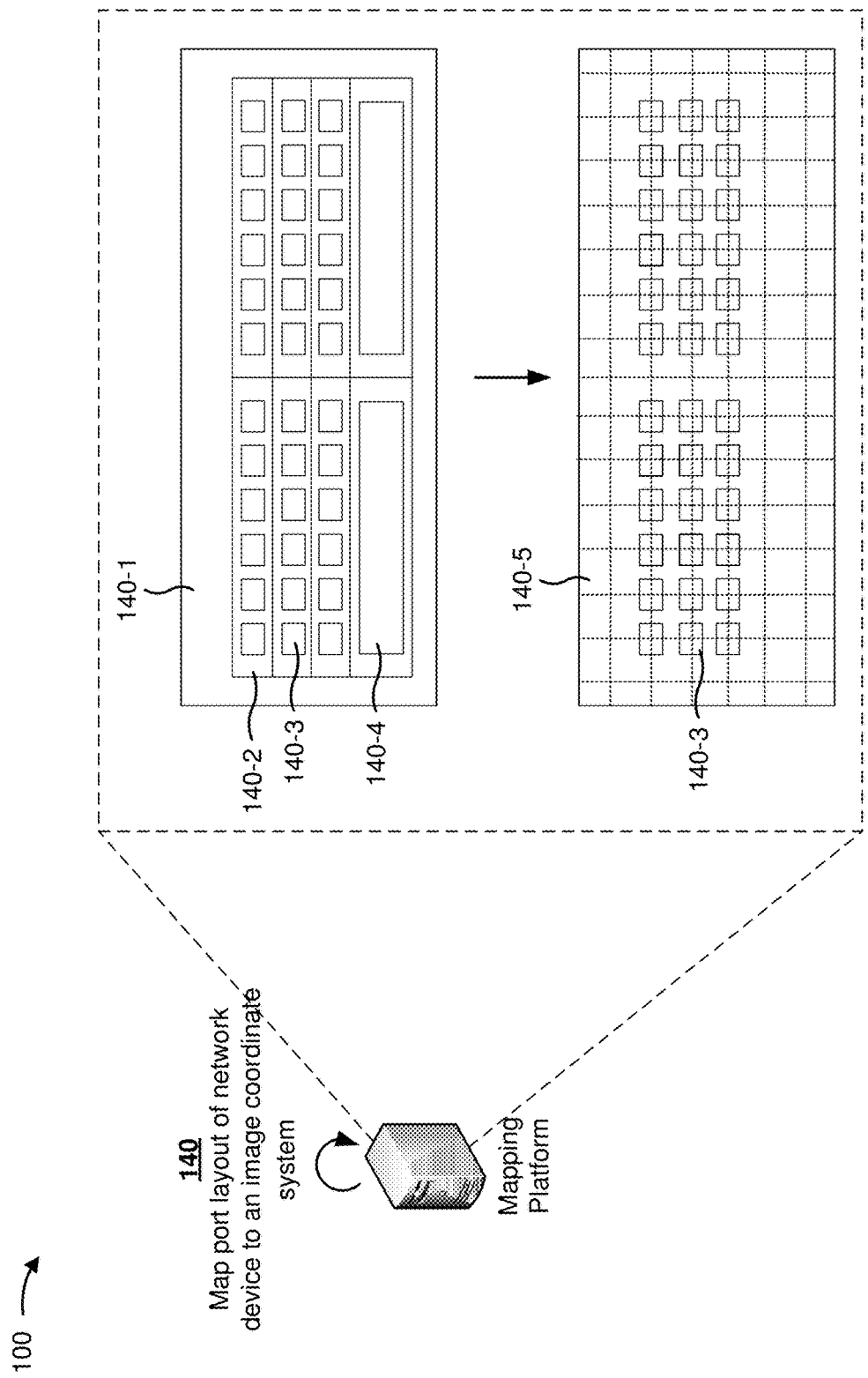

As shown in FIG. 1C, and by reference number 140, the mapping platform may map a port layout of a network device to an image coordinate system to generate a template image of the ports of the network device. In the example shown, the mapping platform may use a port layout 140-1 (e.g., a CPRI port layout) of a baseband unit (e.g., an LTE baseband unit, a 5G baseband unit, and/or the like) associated with the site, including depictions of user plane slots 140-2 (e.g., for transmitting and receiving baseband signals), ports 140-3 (e.g., CPRI ports), control plane slots 140-4 (e.g., for transmitting and receiving control signals), and/or other features of the baseband unit. Port layout 140-1 may be obtained from the site property data in the form of an image file (e.g., a schematic, a drawing, a photograph, and/or the like). In some implementations, port layout 140-1 may include a label, a cue, an index, and/or another indication of ports 140-3 that enables the mapping platform to identify ports 140-3 from within port layout 140-1 and associate ports 140-3 to respective image coordinates of template image 140-5. In some examples, port layout 140-1 may include a template that enables the mapping platform to associate ports 140-3 to the image coordinate system of template image 140-5.

In some implementations, the mapping platform may use a computer vision model and/or another image-based analytic model that is trained to distinguish and recognize ports within a port layout of a network device based on a relative position, a shape, dimensions, and/or another distinct visual pattern of the ports. In some examples, the computer vision model may be stored within the mapping platform, the client device, the network storage device, and/or otherwise accessible to the mapping platform. In some examples, the computer vision model may be trained by the mapping platform, the client device, the network device, and/or the network storage device. In some implementations, another device (e.g., a server device, a cloud computing device, and/or the like) may train the computer vision model and provide the trained computer vision model for use by the mapping platform, the client device, and/or the network storage device. Additionally, or alternatively, the mapping platform may train the computer vision model for use by another device (e.g., a server device, a cloud computing device, and/or the like).

In some implementations, the mapping platform may use one or more artificial intelligence techniques, such as machine learning, deep learning, and/or the like to derive the relative locations of the ports of a network device using information provided in the site property data. For example, the mapping platform may identify attributes relating to a particular network device (e.g., a brand, a model number, a serial number, a part number, a port layout, and/or the like) located at a site, and use the attributes to query a network storage device of a manufacturer of the network device for supporting data (e.g., via a datasheet, an operator's manual, a schematic, a diagram, and/or the like) containing information relating to the port layout. The mapping platform may use a computer vision model, a natural language processing model, and/or the like to parse the information contained in the files, and determine the port layout of the network device.

In some implementations, the mapping platform may parse natural language descriptions of the port layout. For example, the mapping platform may obtain data identifying, in natural language, a description of the port layout of a network device, and may parse the data to identify the relative locations of the ports of the network device, and/or the like. In some examples, the mapping platform may determine a characteristic of the port layout based on natural language processing of a datasheet, an operator's manual, a schematic, a diagram, and/or the like associated with the network device, which may include a description of the ports.

In some implementations, the mapping platform may perform a training operation when generating the model (e.g., the computer vision model, the natural language processing model, and/or the like). For example, the mapping platform may portion site property data relating to a network device into a training set (e.g., a set of data to train the model), a validation set (e.g., a set of data used to evaluate a fit of the model and/or to fine tune the model), a test set (e.g., a set of data used to evaluate a final fit of the model), and/or the like. In some examples, the mapping platform may preprocess and/or perform dimensionality reduction to reduce the site property data to a minimum feature set. In some examples, the mapping platform may train the model on this minimum feature set, thereby reducing processing to train the machine learning model, and may apply a classification technique, to the minimum feature set.

In some implementations, the mapping platform may use a classification technique, such as a logistic regression classification technique, a random forest classification technique, a GBM technique, and/or the like, to determine a categorical outcome (e.g., that a port is successfully identified, that a port is not successfully identified, and/or the like). Additionally, or alternatively, the mapping platform may use a naïve Bayesian classifier technique. In this case, the mapping platform may perform binary recursive partitioning to split the data of the minimum feature set into partitions and/or branches and use the partitions and/or branches to perform predictions (e.g., that a port is successfully identified, or that a port is not successfully identified). Based on using recursive partitioning, the mapping platform may reduce utilization of computing resources relative to manual, linear sorting and analysis of data points, thereby enabling use of thousands, millions, or billions of data points to train a model, which may result in a more accurate model than using fewer data points.

Additionally, or alternatively, where the test data includes image data and/or the like, the mapping platform may use a computer vision technique, such as a convolutional neural network technique to assist in classifying test data (e.g., site property data relating to the port layout of a network device) into a particular class (e.g., a class indicating that the port is successfully identified, a class indicating that the port is not successfully identified, and/or the like). In some cases, the computer vision technique may include using an image recognition technique (e.g., an Inception framework, a ResNet framework, a VGG framework, and/or the like), an object detection technique (e.g. a SSD framework, a YOLO framework, and/or the like), and/or the like.

Additionally, or alternatively, the mapping platform may train the model (e.g., the computer vision model, the natural language processing model, and/or the like) using a supervised training procedure that includes receiving input to the model from a subject matter expert, which may reduce an amount of time, an amount of processing resources, and/or the like to train the model relative to an unsupervised training procedure. In some examples, the mapping platform may use one or more other model training techniques, such as a neural network technique, a latent semantic indexing technique, and/or the like. For example, the mapping platform may perform an artificial neural network processing technique (e.g., using a two-layer feedforward neural network architecture, a three-layer feedforward neural network architecture, and/or the like) to perform pattern recognition with regard to patterns of whether particular information within site property data relating to the network device described using different semantic descriptions can be used to identify the port layout or not. In this case, using the artificial neural network processing technique may improve an accuracy of the model generated by the mapping platform by being more robust to noisy, imprecise, or incomplete data, and by enabling the mapping platform to detect patterns and/or trends undetectable to human analysts or systems using less complex techniques.

Accordingly, the mapping platform may use any number of artificial intelligence techniques, machine learning techniques, deep learning techniques, and/or the like to derive the relative locations of the ports of a network device using information provided in the site property data.

Accordingly, the mapping platform may associate the relative positions of ports 140-3 within port layout 140-1 with the respective image coordinates such that the relative positions of ports 140-3 within template image 140-5 correspond to the relative positions of ports 140-3 within port layout 140-1. In some implementations, the mapping platform may generate multiple template images 140-5 corresponding to multiple surfaces of a network device (e.g., if the network device has ports 140-3 on more than one surface). In some examples, the mapping platform may incorporate features other than ports 140-3 of a network device (e.g., user plane slots 140-2 of a baseband unit, control plane slots 140-4 of a baseband unit, and/or the like) into template image 140-5. Additionally, or alternatively, the mapping platform may store template image 140-5 created for a particular type of network device in a data structure that is accessible to the mapping platform. The mapping platform may thereby generate a library of template images 140-5 indexed with corresponding network devices, one or more of which can be recalled if the mapping platform receives a subsequent query that refers to a similar network device.

Figure 1D:
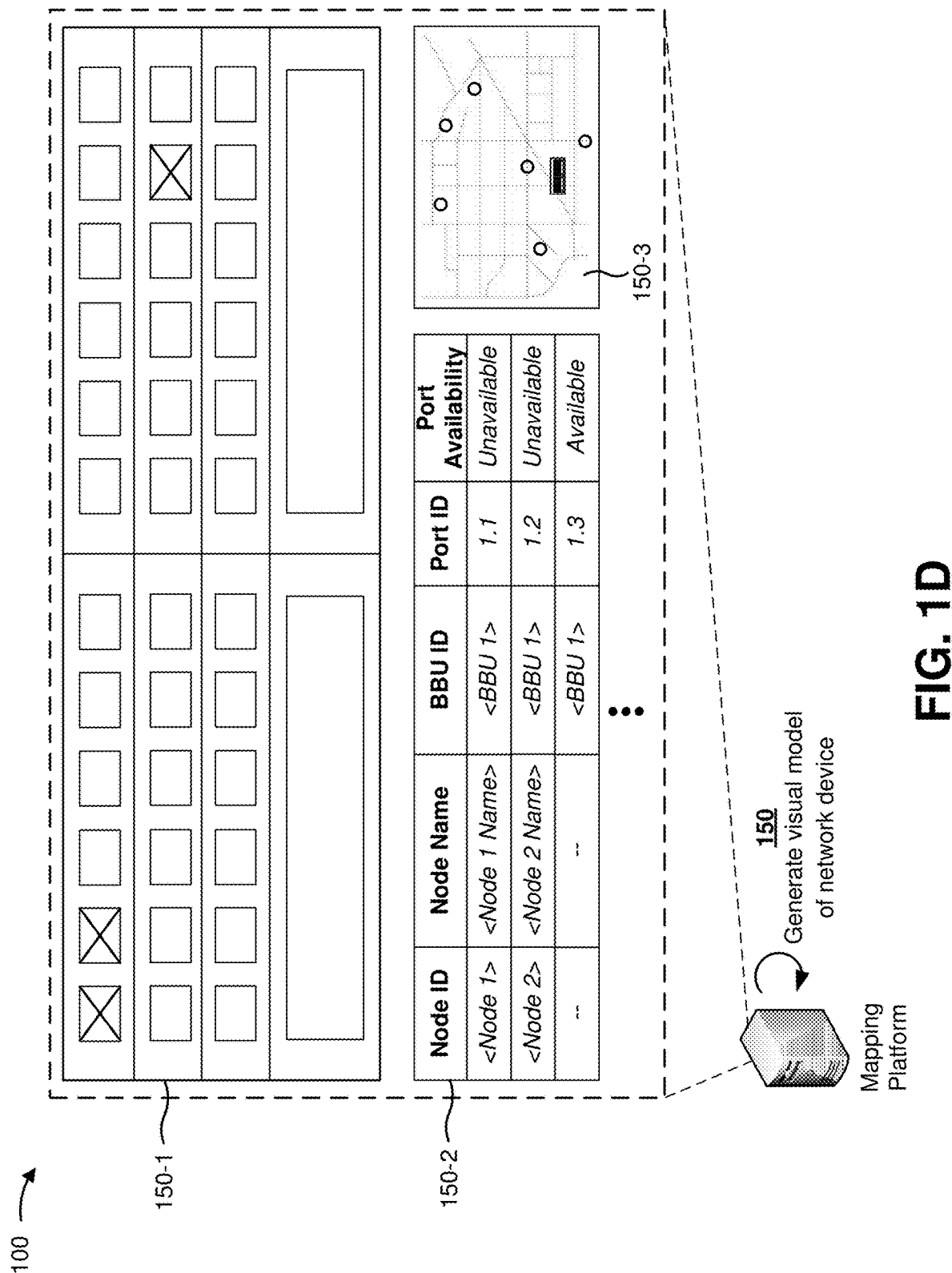

As shown in FIG. 1D, and by reference number 150, the mapping platform may generate a visual model 150-1 of one or more ports of a network device. For example, the visual model 150-1 may correspond to one or more CPRI ports of an LTE baseband unit, a 5G baseband unit, and/or the like. The mapping platform may generate visual model 150-1 based on a port layout (e.g., port layout 140-1 of FIG. 1C obtained via the site property data) and/or based on respective image coordinates (e.g., obtained via template image 140-5 of FIG. 1C). As shown, the mapping platform may generate graphical representations of the ports of the network device (e.g., depicted using rectangular blocks), and position the graphical representations of the ports at the respective image coordinates within visual model 150-1 such that visual model 150-1 resembles the network device. Although depicted as rectangular blocks, in some implementations, the graphical representations of the ports may be depicted using another shape, a symbol, an alphanumeric character, a color, and/or the like. In some examples, the mapping platform may generate graphical representations of additional features of the network device (e.g., user plane slots 140-2, control plane slots 140-4, and/or the like), and position the graphical representations of the additional features within visual model 150-1.

In some implementations, the mapping platform may generate graphical representations of status identifiers of one or more of the ports, and overlay the graphical representations of the status identifiers on the graphical representations of one or more of the ports at the respective image coordinates within visual model 150-1. The status identifiers may be indicative of the respective availabilities of the ports of the network device (e.g., as determined based on the node connection information and/or the port usage information obtained via the node data). As shown for the example in FIG. 1D, a port shown with a status identifier (e.g., depicted using crossed lines) may indicate the port is unavailable (e.g., in use or reserved by another node), whereas a port shown without a status identifier may indicate the port is available for use. Although depicted as crossed lines in FIG. 1D, in some implementations, the graphical representations of the status identifiers may be depicted using another symbol, a shape, a color, an alphanumeric character, and/or the like. In some examples, such as for a C-RAN mobile network, a status identifier of a CPRI port may include a descriptive label identifying an LTE baseband unit or a 5G baseband unit associated with the CPRI port, a C-RAN hub associated with the CPRI port, and/or the like.

In some implementations, the mapping platform may generate a plurality of status identifiers to distinguish between a port that available, a port that is unavailable and in use, a port that is unavailable and reserved, and/or the like. In some examples, a status identifier may include a descriptive label identifying a node that is associated with an unavailable port. In some examples, a reservation of a port may be associated with a reservation period. For example, the reservation period may specify a duration of time for which the port will be reserved, and expiration of the reservation period may trigger cancellation of the reservation. In some implementations, the mapping platform may automatically assign a reservation period to a port that is reserved at a time the reservation is made. If the reserved port is not physically connected to a node and/or in use before the reservation period expires, the mapping platform may automatically cancel the reservation and update the status identifier to indicate that the port is available. In some examples, the reservation period may be assigned by a network device associated with the reserved port, assigned by a user via a client device, and/or the like. Correspondingly, the mapping platform may generate a status identifier for a reserved port that includes a descriptive label indicating a time remaining in the reservation period.

In some implementations, the mapping platform may generate a plurality of two-dimensional visual models 150-1 depicting multiple surfaces of a network device, and/or generate a three-dimensional visual model that can be manipulated by a user via a client device to show one or more surfaces and corresponding ports of the network device. In some examples, the mapping platform may generate graphical representations that are interactive and configured to receive input from a user via a user interface of a client device. For example, the mapping platform may embed or otherwise associate individual graphical representations of the ports with a respective shortcut, link, hyperlink, and/or another interactive element that is selectable by the user using an input device (e.g., a touchscreen, a mouse, a keyboard, a keypad, and/or the like) of the client device. In some examples, the mapping platform may position the interactive elements at the image coordinates of the corresponding ports. Upon selection by a user, the interactive elements may be configured to respond by obtaining information regarding the availability of the port associated with the selection, and/or transmitting information regarding the availability of the port to the client device. In some examples, the mapping platform may enable the interactive elements of visual model 150-1 to provide other forms of interaction with the client device.

In some implementations, the mapping platform may generate an index 150-2 of node connections and port availabilities corresponding to the ports depicted in visual model 150-1. In some examples, index 150-2 may include information relating to one or more CPRI connections (e.g., information identifying one or more CPRI ports, an associated LTE or 5G baseband unit, an associated C-RAN hub, an associated eNB or gNB base station, and/or the like). The mapping platform may embed or otherwise associate individual entries of index 150-2 with an interactive element that is selectable by the user via the client device. Additionally, or alternatively, the mapping platform may configure the interactive elements to link or otherwise associate individual entries of index 150-2 with corresponding graphical representations within visual model 150-1. For example, the mapping platform may configure visual model 150-1 and/or index 150-2 such that user selection of a port within visual model 150-1 highlights or otherwise references the corresponding node connection entry within index 150-2. Similarly, the mapping platform may configure visual model 150-1 and/or index 150-2 such that user selection of a node connection entry within index 150-2 highlights or otherwise references the corresponding port within visual model 150-1. In some examples, the mapping platform may enable the interactive elements of index 150-2 to provide other forms of interaction with the client device.

In some implementations, the mapping platform may generate a geographical map 150-3 depicting a location of a site associated with the depicted network device and nodes connected to the network device. In some examples, the mapping platform may generate a graphical representation (e.g., an icon, a thumbnail, and/or the like) of the network device, and overlay the graphical representation of the network device on map 150-3 at a location corresponding to the site and/or the network device. For example, the graphical representation of the network device within map 150-3 may be indicative of the geographical location of a network device having an available port. In some examples, the mapping platform may generate a graphical representation of a C-RAN hub associated with an LTE baseband unit and/or a 5G baseband unit, and overlay the graphical representation of the C-RAN hub on map 150-3 at the corresponding location. As described with respect to visual model 150-1 and index 150-2 above, the mapping platform may embed or otherwise associate individual locations depicted within map 150-3 with an interactive element that is selectable by the user via the client device and adapted to link map 150-3 with visual model 150-1 and/or index 150-2. For example, user selection of a port within visual model 150-1 and/or an entry within index 150-2 may highlight or otherwise reference the corresponding location within map 150-3, and/or user selection of a location within map 150-3 may highlight or otherwise reference the corresponding port within visual model 150-1 and/or the corresponding entry within index 150-2. In some examples, the mapping platform may enable the interactive elements of map 150-3 to provide other forms of interaction with the client device.

Figure 1E:
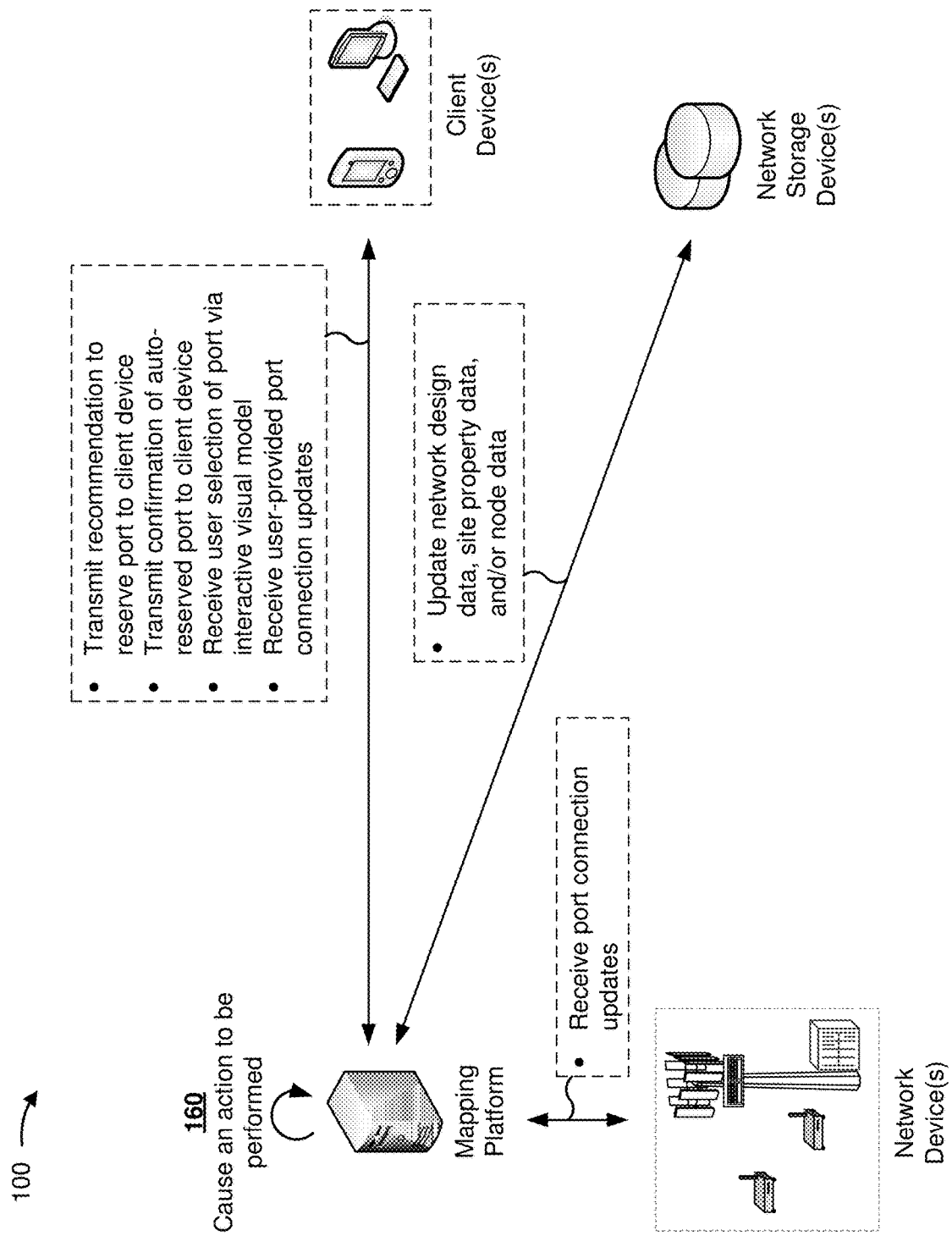

As shown in FIG. 1E, and by reference number 160, the mapping platform may cause an action to be performed based on the visual model. For example, the mapping platform may identify an available port of the network device based on the status identifiers of the visual model (e.g., as determined based on the node connection information and/or the port usage information obtained via the node data), and transmit a recommendation to a user via the client device to reserve the available port to the client device. The mapping platform may identify the available port and transmit the recommendation in response to a query submitted by the user via the client device and/or based on network design data corresponding to a site plan of the user. Upon receiving a confirmation from the client device accepting the recommendation, the mapping platform may reserve the available port for the user, update the status identifier and the availability of the port based on the reservation, and transmit a confirmation of the reservation to the client device. Additionally, or alternatively, the mapping platform may receive a modification to the recommendation from the client device (e.g., user selection of a different port of the network device, user selection of a port of a different network device, user selection of a network device of a different site, and/or the like), and transmit another recommendation to the client device based on the modification.

In some implementations, the mapping platform may use information provided via a query and/or network design data to identify an available port of the network device based on status identifiers of the visual model, automatically reserve the available port, update the status identifier and the availability of the port based on the reservation, and transmit a confirmation of the reservation to the client device. In some examples, the mapping platform may receive a query from the user via the client device requesting availability of a specific port (e.g., via an interactive visual model, index, map, and/or the like), determine availability of the port specified by the user, and transmit information regarding the availability of the port to the client device. If the port is available, the mapping platform may transmit a request to the client device requesting confirmation to reserve the port, and reserve the port based on the confirmation. If the port is unavailable, the mapping platform may identify an alternative port that is available (e.g., another port of a network device associated with the initial query and/or a port of another network device at a site associated with the initial query), and transmit a recommendation to the client device to reserve the alternative port. In some examples, the mapping platform may receive port connection updates based on information manually submitted by the user (e.g., an on-site technician) via the client device.

In some implementations, the mapping platform may update the network design data, the site property data, the node data, and/or the visual model based on a reservation made for the user and/or another change to a port of a network device. For example, if an available port of a network device was reserved for the user as described above, the mapping platform may transmit information relating to the change to one or more network storage devices managing network design data to update the associated site plan. In some examples, the mapping platform may transmit information relating to the change to one or more network storage devices managing the node data such that subsequent queries reflect the reserved port. In some examples, such as if port connection updates are received from the user via the client device, the mapping platform may correspondingly update the network design data, the site property data, the node data, and/or the visual model. In some implementations, the network device may be configured to detect changes to respective ports (e.g., detect when a port is connected to a node, when a port is disconnected from a node, when a port is reserved for a node, when a reservation of a port is canceled, and/or the like). The mapping platform may receive port connection updates from capable network devices, and correspondingly update the network design data, the site property data, the node data, and/or the visual model.

In this way, the mapping platform is able to help mobile network operators quickly and easily track the availability of ports of a network device of a particular site, identify available ports, and reserve available ports for a site plan in an efficient and reliable manner. In particular, the mapping platform leverages network analytics data to automate several manual steps involved in identifying and reserving an available port for a site plan. The mapping platform thereby reduces the reliance on on-site technicians and minimizes risks of human error. The mapping platform also saves a considerable amount of time in designing a site plan, thereby enabling mobile network operators to more promptly carry out new builds, upgrades, and/or repairs, and maintaining associated network equipment and/or user equipment in optimal operating condition. The mapping platform additionally conserves time, computational resources, and network resources that mobile network operators may otherwise use to identify and reserve available ports of a network device. Furthermore, the automatability of the mapping platform enables mobile network operators to readily support newer radio access technologies.

As indicated above, FIGS. 1A-1E are provided as one or more examples. Other examples can differ from what is described with regard to FIGS. 1A-1E.

Figure 2:
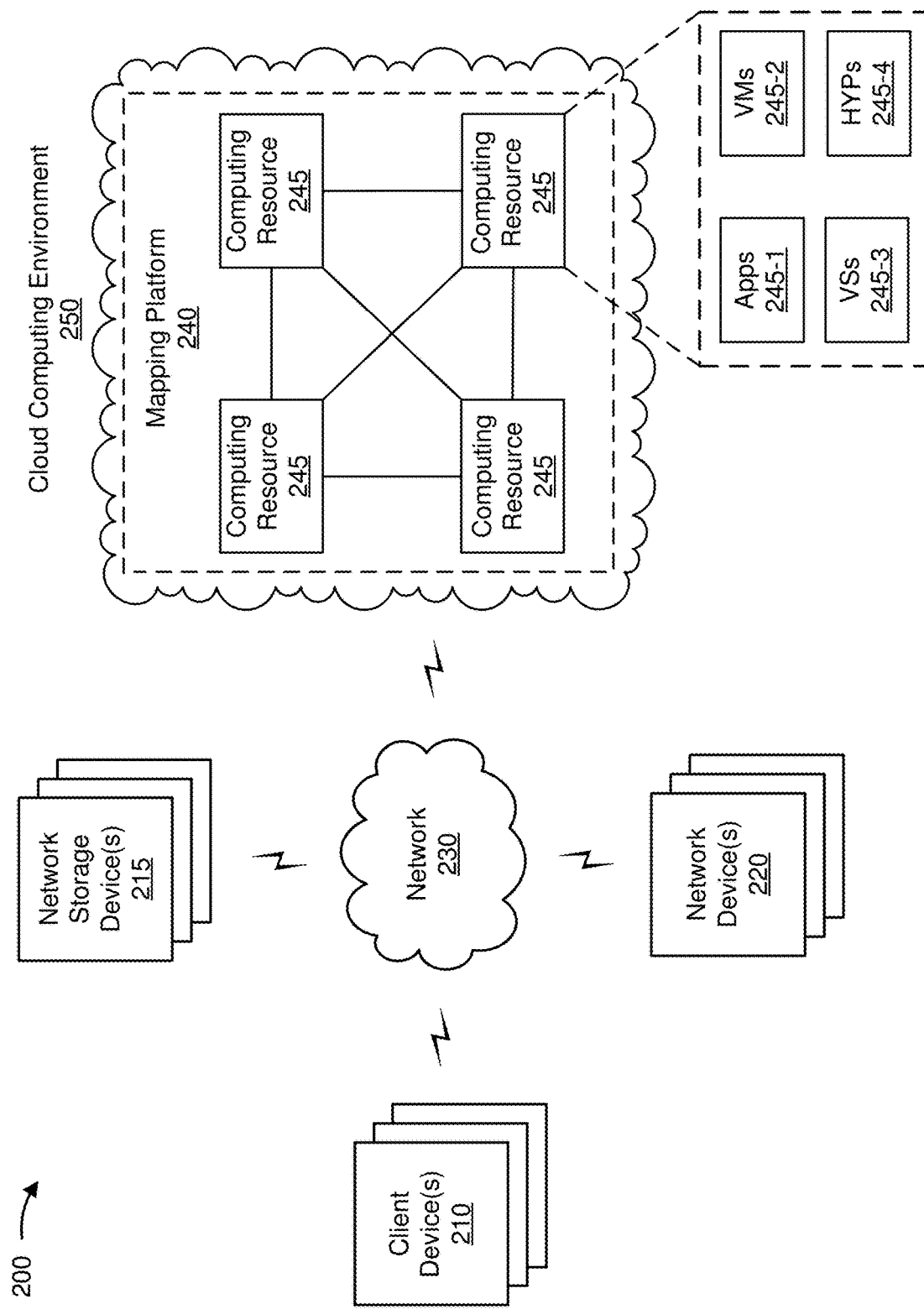
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more client devices 210 (referred to herein individually as client device 210 and collectively as client devices 210), one or more network storage devices 215 (referred to herein individually as network storage device 215 and collectively as network storage devices 215), one or more network devices 220 (referred to herein individually as network device 220 and collectively as network devices 220), network 230, mapping platform 240, computing resource 245, and cloud computing environment 250. Devices of environment 200 may interconnect via wired connections, wireless connections, or a combination of wired and wireless connections.

Client device 210 includes one or more devices capable of receiving, generating, storing, processing, and/or providing information associated with mapping ports of a network device. For example, client device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network storage device 215 includes one or more devices capable of storing, processing, and/or routing information. Network storage device 215 may include, for example, a server device, a device that stores a data structure, a device in a cloud computing environment or a data center, a device in a core network of a network operator, a network controller, and/or the like. In some implementations, network storage device 215 may include a communication interface that allows network storage device 215 to receive information from and/or transmit information to other devices in environment 200, such as client device 210, mapping platform 240, and/or the like.

Network device 220 includes one or more devices capable of receiving, generating, storing, transmitting, processing, and/or routing information. Network device 220 may include, for example, a baseband unit, a base station, a router, a modem, a switch, a gateway, an access point, and/or the like. In some examples, network device 220 may include an L baseband unit, a 5G baseband unit, and/or another baseband unit configured for CPRI connections within a C-RAN mobile network. In some implementations, network device 220 may include a communication interface that allows network device 220 to receive information from and/or transmit information to other devices in environment 200, such as client device 210, network storage device 215, mapping platform 240, and/or the like.

Network 230 includes one or more wired and/or wireless networks. For example, network 230 may include a cellular network (e.g., an LTE network, a code division multiple access (CDMA) network, a 2G network, a 3G network, a 4G network, a 5G network, a new radio (NR) network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Mapping platform 240 includes one or more computing devices configured to track port connections and identify available ports for use with a site plan. In some implementations, mapping platform 240 may receive site property data relating to a site, receive node data relating to a node associated with the site, determine an availability of one or more ports of network device 220 associated with the site, map a layout of the ports to an image coordinate system, generate a visual model of the ports of network device 220 with status identifiers indicating availability, and cause an action to be performed based on the visual model. In some implementations, mapping platform 240 may be designed to be modular such that certain software components may be swapped in or out depending on a particular need. As such, mapping platform 240 may be easily and/or quickly reconfigured for different uses. In some implementations, mapping platform 240 may receive information from and/or transmit information to client device 210, network storage device 215, network device 220, and/or the like.

In some implementations, mapping platform 240 may include a server device or a group of server devices. In some implementations, mapping platform 240 may be hosted in cloud computing environment 250. Notably, while implementations described herein describe mapping platform 240 as being hosted in cloud computing environment 250, in some implementations, mapping platform 240 may be non-cloud-based or may be partially cloud-based.

Cloud computing environment 250 includes an environment that delivers computing as a service, whereby shared resources, services, and/or the like may be provided to client device 210, network storage device 215, and/or the like. Cloud computing environment 250 may provide computation, software, data access, storage, and/or other services that do not require end-user knowledge of a physical location and configuration of a system and/or a device that delivers the services. As shown, cloud computing environment 250 may include mapping platform 240 and computing resource 245.

Computing resource 245 includes one or more personal computers, workstation computers, server devices, or another type of computation and/or communication device. In some implementations, computing resource 245 may host mapping platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by client device 210. Application 245-1 may eliminate a need to install and execute the software applications on client device 210. For example, application 245-1 may include software associated with mapping platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., client device 210), and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
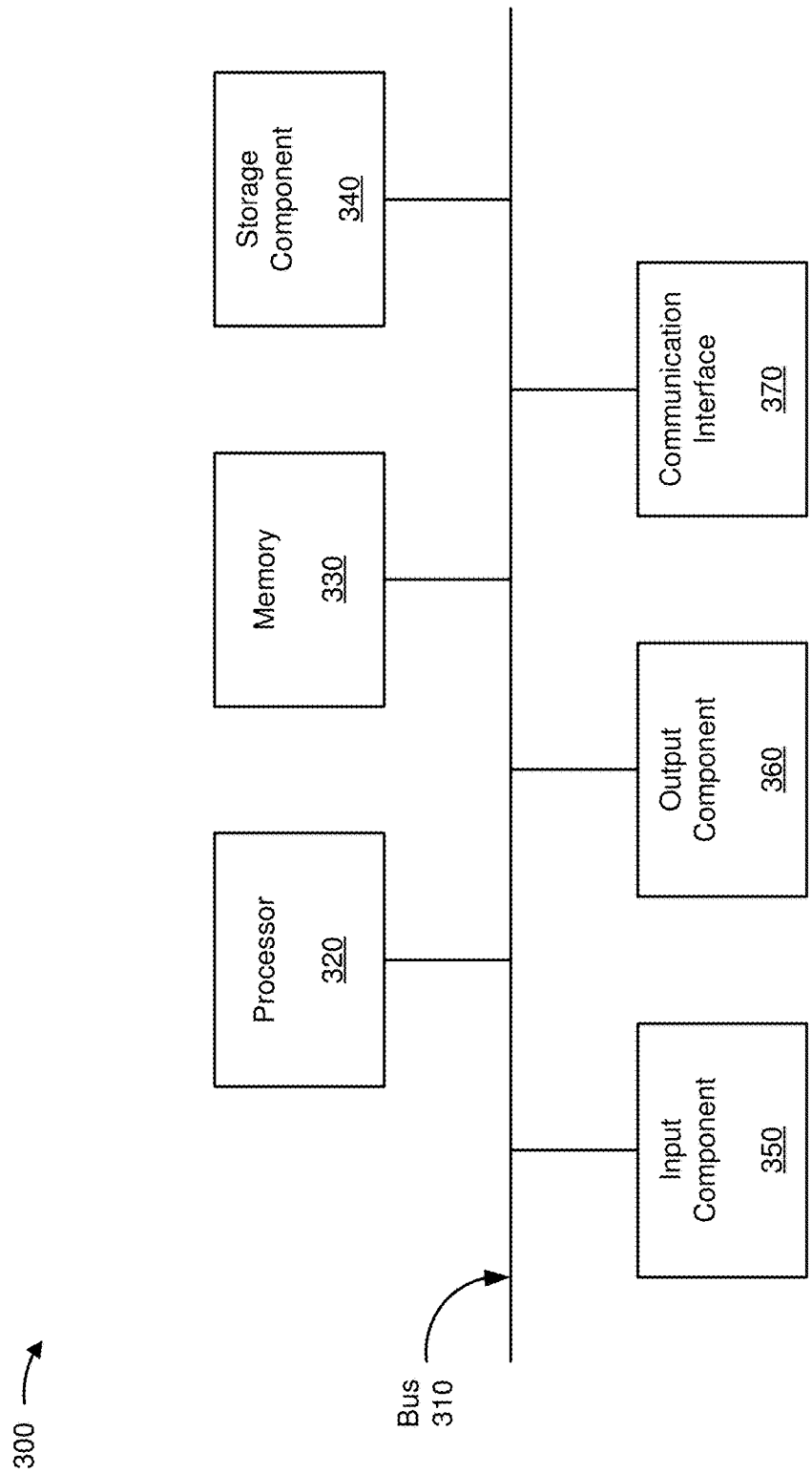
FIG. 3 is a diagram of example components of one or more devices of FIG. 2.

FIG. 3 is a diagram of example components of a device 300. Device 300 may correspond client device 210, network storage device 215, network device 220, mapping platform 240, and/or computing resource 245. In some implementations, client device 210, network storage device 215, mapping platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
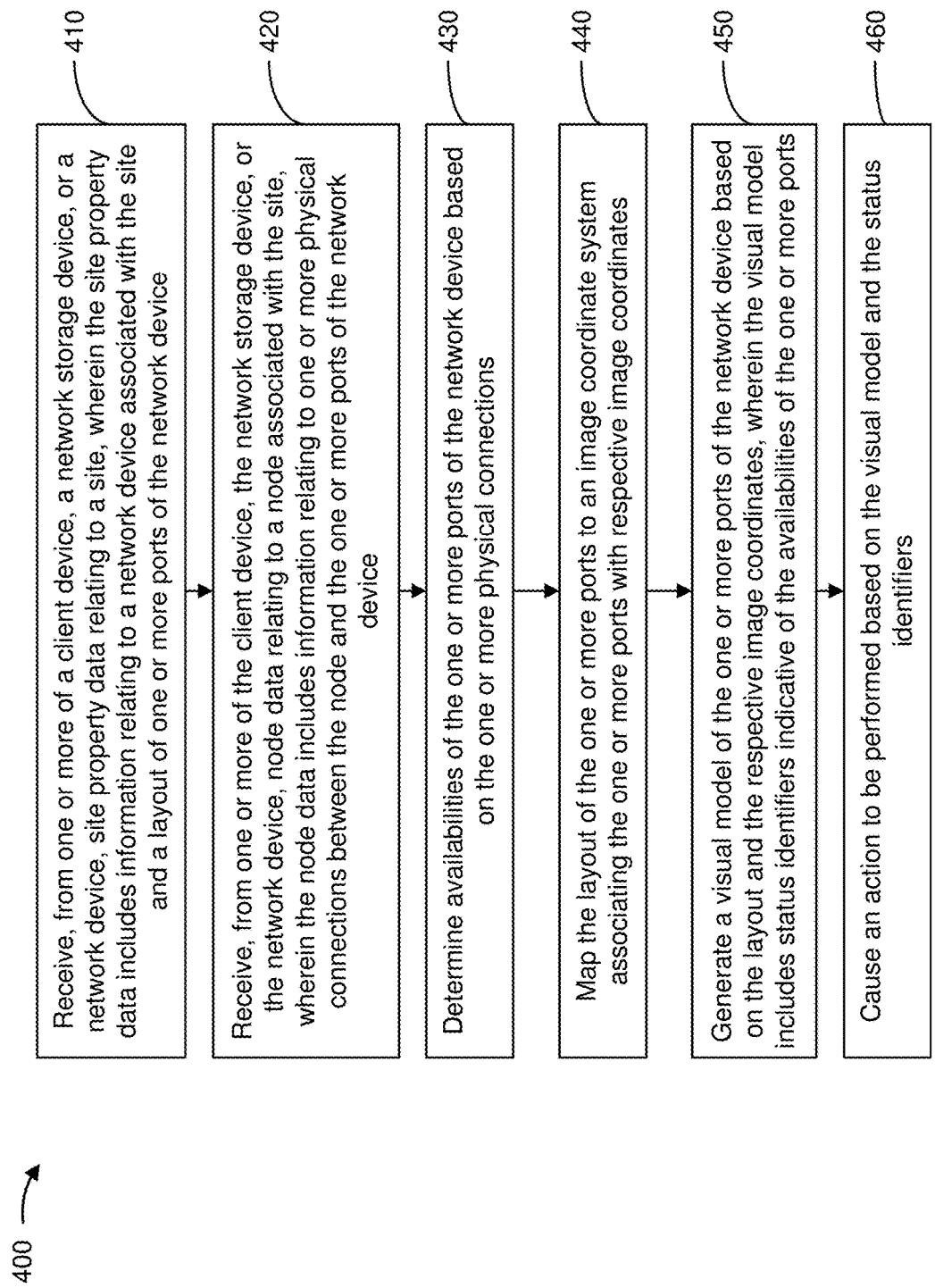
FIG. 4 is a flow chart of an example process for mapping ports of a network device.

FIG. 4 is a flow chart of an example process 400 for mapping ports of a network device. In some implementations, one or more process blocks of FIG. 4 may be performed by a mapping platform (e.g., mapping platform 240). In some implementations, one or more process blocks of FIG. 4 may be performed by another device or a group of devices separate from or including the mapping platform, such as a client device (e.g., client device 210), a network storage device (e.g., network storage device 215), or a network device (e.g., network device 220).

As shown in FIG. 4, process 400 may include receiving site property data relating to a site, wherein the site property data includes information relating to a network device associated with the site and a layout of one or more ports of the network device (block 410). For example, the mapping platform (e.g., using a computing resource 245, a processor 320, a memory 330, a storage component 340, an input component 350, a communication interface 370, and/or the like) may receive site property data relating to a site, as described above. The mapping platform may receive the site property data from the client device, the network storage device, and/or the network device. The site property data may include information relating to a network device associated with the site and a layout of one or more ports of the network device. For example, the site property data may include location information of the site and information relating to one or more network devices associated with the site (e.g., an inventory of baseband units, base stations, routers, modems, switches, gateways, access points, and/or the like). In some implementations, the site property data may include network device specifications (e.g., information relating to a brand, a model number, a serial number, a part number, a port layout, and/or the like). In some examples, the site property data may include information sufficient for the mapping platform to access or otherwise determine the port layout of a network device from another source (e.g., a network storage device maintained by a manufacturer of the network device).

As shown in FIG. 4, process 400 may include receiving node data relating to a node associated with the site, wherein the node data includes information relating to one or more physical connections between the node and the one or more ports of the network device (block 420). For example, the mapping platform (e.g., using a computing resource 245, a processor 320, a memory 330, a storage component 340, an input component 350, a communication interface 370, and/or the like) may receive node data relating to a node associated with the site, as described above. The mapping platform may receive the site property data from the client device, the network storage device, and/or the network device. The node data may include information relating to one or more physical connections between the node and the one or more ports of the network device. For example, the node data may include information relating to one or more nodes associated with the site (e.g., node identification information, node location information, node hardware information, node connection information, node network information, and/or the like). In some implementations, the node hardware information may include information for identifying the particular network device associated with the site that a node is connected to. The node connection information may include information for identifying the particular port of the network device associated with the site that a node is connected to. In some implementations, the node data may include one or more indexes of port usage information (e.g., identifying specific ports of the network device that are physically connected to a node, specific ports of the network device that are reserved for a node, specific ports of the network device that are unconnected and unreserved, and/or the like).

As shown in FIG. 4, process 400 may include determining availabilities of the one or more ports of the network device based on the one or more physical connections (block 430). For example, the mapping platform (e.g., using a computing resource 245, a processor 320, a memory 330, a storage component 340, and/or the like) may determine availabilities of the one or more ports of the network device based on the one or more physical connections, as described above. In some implementations, the mapping platform may determine the availability of one or more ports of a baseband unit associated with the site. For example, the mapping platform may determine a port that is physically connected to a node or reserved for a node is unavailable, and determine a port that is neither physically connected nor reserved is available. In some implementations, the mapping platform may determine port availability of a plurality of baseband units associated with the site and/or determine port availability for another network device associated with the site. The mapping platform may store port availability information and corresponding node information in a data structure that is accessible by the mapping platform.

As further shown in FIG. 4, process 400 may include mapping the layout of the one or more ports to an image coordinate system associating the one or more ports with respective image coordinates (block 440). For example, the mapping platform (e.g., using a computing resource 245, a processor 320, a memory 330, a storage component 340, and/or the like) may map the layout of the one or more ports to an image coordinate system associating the one or more ports with respective image coordinates, as described above. In some implementations, the mapping platform may map a port layout of a network device to an image coordinate system to generate a template image of the ports of the network device. For example, the mapping platform may use a port layout of a baseband unit associated with the site, including depictions of user plane slots, ports, control plane slots, and/or other features of a baseband unit. The port layout may be obtained from the site property data in the form of an image file (e.g., a schematic, a drawing, a photograph, and/or the like). In some implementations, the port layout may include a label, a cue, an index, and/or another indication of the ports that enables the mapping platform to identify the ports from within the port layout and associate the ports to respective image coordinates of the template image. In some examples, the port layout may include a template that enables the mapping platform to associate the ports to the image coordinate system of the template image. In some examples, the mapping platform may use a computer vision model and/or another image-based analytic model that is trained to distinguish and recognize the ports within the port layout based on a relative position, a shape, dimensions, and/or another distinct visual pattern of the ports.

In some implementations, the mapping platform may generate multiple template images corresponding to multiple surfaces of a network device (e.g., if the network device has ports on more than one surface). In some examples, the mapping platform may incorporate features other than the ports of a network device (e.g., user plane slots of a baseband unit, control plane slots of a baseband unit, and/or the like) into the template image. Additionally, or alternatively, the mapping platform may store the template image created for a particular type of network device in a data structure that is accessible to the mapping platform. The mapping platform may thereby generate a library of the template image indexed with corresponding network devices, one or more of which can be recalled if the mapping platform receives a subsequent query that refers to the network device.

As further shown in FIG. 4, process 400 may include generating a visual model of the one or more ports of the network device based on the layout and the respective image coordinates, wherein the visual model includes status identifiers indicative of the availabilities of the one or more ports (block 450). For example, the mapping platform (e.g., using a computing resource 245, a processor 320, a memory 330, a storage component 340, and/or the like) may generate a visual model of the one or more ports of the network device based on the layout and the respective image coordinates, as described above. The visual model may include status identifiers indicative of the availabilities of the one or more ports. In some implementations, the mapping platform may generate the visual model based on a port layout and/or based on respective image coordinates. The mapping platform may generate graphical representations of the ports of the network device, and position the graphical representations of the ports at the respective image coordinates within the visual model such that the visual model resembles the network device. In some examples, the mapping platform may generate graphical representations of additional features of the network device (e.g., user plane slots 140-2, control plane slots 140-4 of a baseband unit), and position the graphical representations of the additional features within the visual model.

In some implementations, the mapping platform may generate graphical representations of status identifiers of one or more of the ports, and overlay the graphical representations of the status identifiers on the graphical representations of one or more of the ports at the respective image coordinates within the visual model. The status identifiers may be indicative of the respective availabilities of the ports of the network device. In some examples, the status identifiers may include a descriptive label identifying the node associated with the port. In some examples, the mapping platform may generate a status identifier to indicate an available port, and/or generate different status identifiers to distinguish between ports that are in use and ports that are reserved.

In some implementations, the mapping platform may generate a plurality of two-dimensional visual models depicting multiple surfaces of a network device, and/or generate a three-dimensional visual model that can be manipulated by a user via a client device to show one or more surfaces of the network device. In some examples, the mapping platform may generate graphical representations of the one or more ports that are interactive and configured to receive input from a user via a user interface of a client device. In some examples, the mapping platform may generate an index of node connections and port availabilities corresponding to the ports depicted in the visual model. In some examples, the mapping platform may generate a geographical map depicting a location of a site associated with the depicted network device and nodes connected to the network device. In some examples, the mapping platform may generate a graphical representation of the network device, and overlay the graphical representation of the network device on the map at a location corresponding to the site and the network device. For example, the graphical representation of the network device within the map may be indicative of the geographical location of a network device with an available port.

As further shown in FIG. 4, process 400 may include causing an action to be performed based on the visual model and the status identifiers (block 460). For example, the mapping platform (e.g., using a computing resource 245, a processor 320, a memory 330, a storage component 340, an input component 350, an output component 360, a communication interface 370, and/or the like) may cause an action to be performed based on the visual model and the status identifiers, as described above. In some implementations, the mapping platform may identify an available port of the network device based on the status identifiers of the visual model, and transmit a recommendation to a user via the client device to reserve the available port to the client device. The mapping platform may identify the available port and transmit the recommendation in response to a query submitted by the user via the client device and/or based on network design data corresponding to a site plan of the user. Upon receiving a confirmation from the client device accepting the recommendation, the mapping platform may reserve the available port for the user, update the status identifier and the availability of the port based on the reservation, and transmit a confirmation of the reservation to the client device. Additionally, or alternatively, the mapping platform may receive a modification to the recommendation from the client device, and transmit another recommendation to the client device based on the modification.

In some implementations, the mapping platform may use information provided via a query and/or network design data to identify an available port of the network device based on status identifiers of the visual model, automatically reserve the available port, update the status identifier and the availability of the port based on the reservation, and transmit a confirmation of the reservation to the client device. In some examples, the mapping platform may receive a query from the user via the client device requesting availability of a specific port, determine availability of the port specified by the user, and transmit information regarding the availability of the port to the client device. If the port is available, the mapping platform may transmit a request to the client device requesting confirmation to reserve the port, and reserve the port based on the confirmation. If the port is unavailable, the mapping platform may identify an alternative port that is available (e.g., another port of a network device associated with the initial query and/or a port of another network device at a site associated with the initial query), and transmit a recommendation to the client device to reserve the alternative port. In some examples, the mapping platform may receive port connection updates based on information manually submitted by the user (e.g., an on-site technician) via the client device.

In some implementations, the mapping platform may update the network design data, the site property data, and/or the node data based on a reservation made for the user and/or another change to a port of a network device. For example, if an available port of a network device was reserved for the user as described above, the mapping platform may transmit information relating to the change to one or more network storage devices managing network design data to update the associated site plan. In some examples, the mapping platform may transmit information relating to the change to one or more network storage devices managing the node data such that subsequent queries reflect the reserved port. In some examples, such as if port connection updates are received from the user via the client device, the mapping platform may correspondingly update the network design data, the site property data, and/or the node data. In some implementations, the network device may be configured to detect changes to respective ports (e.g., detect when a port is connected to a node, when a port is disconnected from a node, when a port is reserved for a node, when a reservation of a port is canceled, and/or the like). The mapping platform may receive port connection updates from capable network devices, and correspondingly update the network design data, the site property data, and/or the node data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, site property data relating to a site,
      wherein the site property data includes information relating to a network device associated with the site, the network device including a baseband unit, and the site property data includes a layout of one or more ports of the baseband unit;
   receiving, by the device, node data relating to a node associated with the site,
      wherein the node data includes information relating to one or more physical connections between the node and the one or more ports of the baseband unit;
   determining, by the device, availabilities of the one or more ports of the baseband unit based on the one or more physical connections;
   mapping, by the device, the layout of the one or more ports to an image coordinate system associating the one or more ports with respective image coordinates;
   generating, by the device, a visual model of the one or more ports of the baseband unit based on the layout and the respective image coordinates,
      wherein the visual model includes status identifiers indicative of the availabilities of the one or more ports,
      wherein generating the visual model comprises:
         generating graphical representations of the status identifiers of the one or more ports; and
         overlaying the graphical representations of the status identifiers on graphical representations of the one or more ports at the respective image coordinates within the visual model; and
   performing, by the device, an action based on the visual model and the status identifiers.

2. The method of claim 1, wherein the node data includes port usage information identifying the one or more ports of the baseband unit physically connected to the node.

3. The method of claim 1, wherein determining the availabilities of the one or more ports comprises:
   determining one of the one or more ports is unavailable if the one of the one or more ports is physically connected to the node; or
   determining one of the one or more ports is available if the one of the one or more ports is not physically connected to the node.

4. The method of claim 1, wherein mapping the layout of the one or more ports comprises:
   associating the one or more ports with the respective image coordinates such that relative positions of the one or more ports within the image coordinate system correspond to relative positions of the one or more ports within the layout.

5. The method of claim 1, wherein generating the visual model comprises:
   generating the graphical representations of the one or more ports; and
   positioning the graphical representations of the one or more ports at the respective image coordinates within the visual model.

6. The method of claim 1, wherein performing the action comprises:
   generating interactive graphical representations of the one or more ports;
   positioning the interactive graphical representations of the one or more ports at the respective image coordinates within the visual model;
   receiving information identifying a selected one of the interactive graphical representations from a client device;
   identifying a selected one of the one or more ports based on the selected one of the interactive graphical representations; and
   transmitting information regarding the availability of the selected one of the one or more ports to the client device.

7. The method of claim 1, wherein performing the action comprises:
  generating a map depicting the site and the node associated with the site,
    wherein the site property data includes site location information and the node data includes node location information, and
    wherein the map is generated based on the site location information and the node location information;
  generating a graphical representation of the network device,
    wherein the graphical representation of the network device is indicative of an available port of the network device;
  overlaying the graphical representation of the network device on the map at a location corresponding to the site location information; and
  transmitting the map to a client device.

8. A device, comprising:
  one or more memories; and
  one or more processors, communicatively coupled to the one or more memories, to:
    receive site property data relating to a site,
      wherein the site property data includes information relating to a network device associated with the site,
      the network device including a baseband unit, and
      the site property data includes a layout of one or more ports of the baseband unit;
    receive node data relating to a node associated with the site,
      wherein the node data includes information relating to one or more physical connections and one or more reserved connections between the node and the one or more ports of the baseband unit;
    determine availabilities of the one or more ports of the baseband unit based on the one or more physical connections and the one or more reserved connections;
    associate the one or more ports with respective image coordinates based on the layout;
    generate a visual model of the one or more ports of the baseband unit based on the layout and the respective image coordinates,
      wherein the visual model includes status identifiers indicative of the availabilities of the one or more ports, and
      wherein the one or more processors, when generating the visual model, are to:
        generate graphical representations of the status identifiers of the one or more ports; and
        overlay the graphical representations of the status identifiers on graphical representations of the one or more ports at the respective image coordinates within the visual model; and
    perform an action based on the visual model and the status identifiers.

9. The device of claim 8, wherein the site property data includes information relating to a plurality of network devices associated with the site and layouts of the plurality of network devices.

10. The device of claim 8, wherein the node data includes information relating to a plurality of nodes associated with the site, one or more physical connections between the plurality of nodes and the network device, and one or more reserved connections between the plurality of nodes and the network device.

11. The device of claim 8, wherein the one or more processors, when determining the availabilities of the one or more ports, are to:
  determine one of the one or more ports is unavailable if the one of the one or more ports is physically connected to the node;
  determine one of the one or more ports is unavailable if the one of the one or more ports is reserved; or
  determine one of the one or more ports is available if the one of the one or more ports is neither physically connected to the node nor reserved for the node.

12. The device of claim 8, wherein the one or more processors, when generating the visual model, are to:
  generate graphical representations of the one or more ports; and
  position the graphical representations of the one or more ports at the respective image coordinates within the visual model.

13. The device of claim 8, wherein the one or more processors, when generating the visual model, are to:
  generate graphical representations of the status identifiers of the one or more ports,
    wherein the graphical representations of the status identifiers indicate one of an available status or an unavailable status; and
  position the graphical representations of the status identifiers at the respective image coordinates within the visual model.

14. A non-transitory computer-readable medium storing instructions, the instructions comprising:
  one or more instructions that, when executed by one or more processors, cause the one or more processors to:
    receive, from a client device, a query relating to port availability within a site;
    receive site property data relating to the site,
      wherein the site property data includes information relating to a network device associated with the site,
      the network device including a baseband unit, and
      the site property data includes a layout of a plurality of ports of the network device;
    receive node data relating to a node associated with the site,
      wherein the node data includes information relating to one or more reserved connections between the node and the plurality of ports of the baseband unit;
    determine availabilities of the plurality of ports of the baseband unit based on the one or more reserved connections;
    associate the plurality of ports with respective image coordinates based on the layout;
    generate a visual model of the plurality of ports of the baseband unit based on the layout and the respective image coordinates,
      wherein the visual model includes a status identifier indicative of the availabilities of the plurality of ports, and
      wherein the one or more instructions, that cause the one or more processors to generate the visual model, cause the one or more processors to
        generate graphical representations of the status identifiers of the plurality of ports; and
        overlay the graphical representations of the status identifiers on graphical representations of the plurality of ports at the respective image coordinates within the visual model; and perform an action based on the visual model and the status identifier.

15. The non-transitory computer-readable medium of claim 14, wherein the node data includes information relating to a plurality of nodes associated with the site and one or more reserved connections between the plurality of nodes and the network device.

16. The non-transitory computer-readable medium of claim 14, wherein the node data includes port usage information identifying the plurality of ports of the network device reserved for the node.

17. The non-transitory computer-readable medium of claim 14, wherein the graphical representations of the status identifiers indicate one of an available status or an unavailable status, and
wherein the one or more instructions, that cause the one or more processors to generate the visual model, cause the one or more processors to:
position the graphical representations of the status identifiers at the respective image coordinates within the visual model.

18. The non-transitory computer-readable medium of claim 14, wherein the one or more instructions, that cause the one or more processors to perform the action, cause the one or more processors to:
generate interactive graphical representations of the plurality of ports;
position the interactive graphical representations of the plurality of ports at the respective image coordinates within the visual model;
receive information identifying a selected one of the interactive graphical representations from a client device;
identify a selected one of the plurality of ports based on the selected one of the interactive graphical representations; and
transmit information regarding the availability of the selected one of the plurality of ports to the client device.

19. The non-transitory computer-readable medium of claim 14, wherein the one or more instructions, that cause the one or more processors to perform the action, cause the one or more processors to:
identify an available port of the network device based on the status identifiers of the plurality of ports;
transmit a recommendation to reserve the available port to the client device;
receive a confirmation from the client device accepting the recommendation;
reserve the available port based on the confirmation; and
update the status identifier and the availability of the available port based on the reservation.

20. The non-transitory computer-readable medium of claim 14, wherein the one or more instructions, that cause the one or more processors to perform the action, cause the one or more processors to:
identify an available port of the network device based on status identifiers of the plurality of ports;
reserve the available port;
update the status identifier and the availability of the available port based on the reservation; and
transmit a confirmation of the reservation to the client device.

* * * * *